Figure 1:
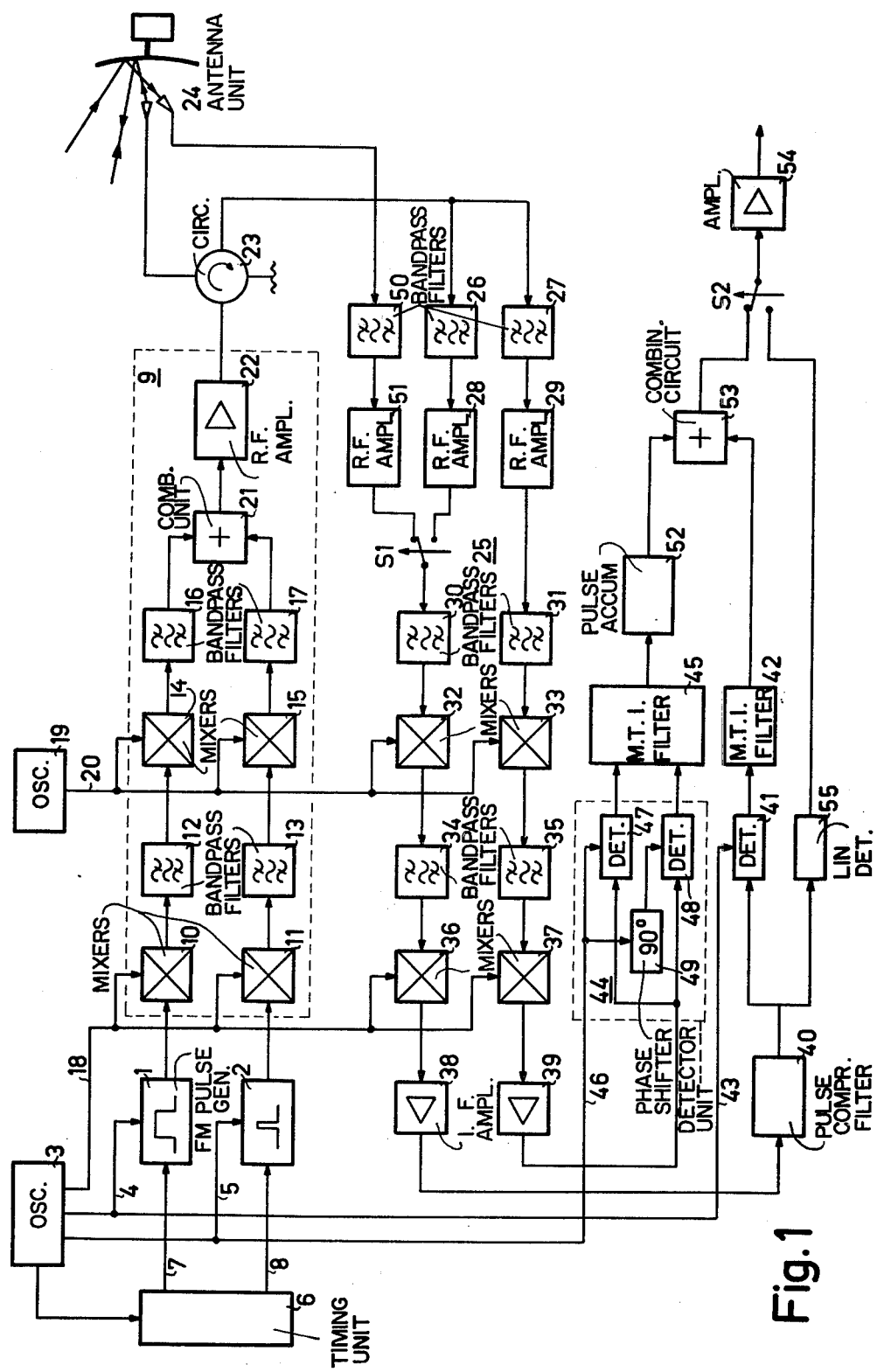

United States Patent [19]

Mulder et al.

[11] 4,136,341
[45] Jan. 23, 1979

[54] RADAR SYSTEM EMPLOYING TWO KINDS OF PULSES

[75] Inventors: Willem Mulder, Borne; Antonius F. M. Bouman, Hengelo; Johan M. C. Zwarts, Borne, all of Netherlands

[73] Assignee: Hollandse Signaalapparaten, B.V., Hengelo, Netherlands

[21] Appl. No.: 846,692

[22] Filed: Oct. 31, 1977

[30] Foreign Application Priority Data

Nov. 12, 1976 [NL] Netherlands .................. 7612575

[51] Int. Cl.² ..................... G01S 9/233; G01S 9/42
[52] U.S. Cl. ................... 343/17.2 PC; 343/7.7
[58] Field of Search ................... 343/7.7, 17.2 PC

[56] References Cited

U.S. PATENT DOCUMENTS

| | | | |
|---|---|---|---|
| 3,281,840 | 10/1966 | Feten | 343/7.7 |
| 3,945,011 | 3/1976 | Glasgow | 343/17.2 PC |
| 3,979,748 | 9/1976 | Gelleknik | 343/17.2 PC X |
| 4,053,884 | 10/1977 | Cantrell et al. | 343/17.2 PC X |

*Primary Examiner*—T. H. Tubbesing
*Attorney, Agent, or Firm*—Thomas A. Briody; David R. Treacy; Algy Tamoshunas

[57] ABSTRACT

A radar system comprises a first generator for generating frequency modulated transmitter pulses of relatively long duration and a second generator for generating transmitter pulses of relatively short duration, the pulse repetition frequency of the second generator being greater than that of the first generator. The radar system further comprises a receiver having a first receiving channel, containing a pulse compression filter for the detection of return signals from the frequency-modulated transmitter pulses of relatively long duration, and a second receiving channel for the detection of return signals from the transmitter pulses of relatively short duration.

5 Claims, 4 Drawing Figures

RADAR SYSTEM EMPLOYING TWO KINDS OF PULSES

The invention relates to a radar system comprising:

(a) a first generator for generating frequency-modulated transmitter pulses of relatively long duration;

(b) a second generator for generating transmitter pulses of relatively short duration;

(c) a transmitter channel, coupled to said first and second generators for transmitting both the long- and short-duration transmitter pulses; and (d) a receiver having a first receiving channel, containing a pulse compression filter, for the detection of return signals from the frequency-modulated transmitter pulses of relatively long duration, and a second receiving channel for the detection of return signals from the transmitter pulses of relatively short duration. Such a radar system is known, among others, from the U.S. Pat. No. 3,945,011. In the system described in the cited patent the transmitter pulses produced by the first generator are separated by a predetermined interval from the transmitter pulses produced by the second generator. The latter transmitter pulses of relatively short duration provide signals indicative of nearby targets, while the frequency-modulated transmitter pulses of relatively long duration provide signals indicative of distant targets.

If the radar beam is to illuminate distant targets, and if second-time-around echoes are to be avoided, the pulse repetition frequency should be relatively low, for example 500 Hz for the detection of targets at a range of 200 to 250 km. If such a pulse repetition frequency is utilised and the received and detected return signals are supplied to an MTI filter, the target echoes passed are accompanied by a relatively large amount of clutter signals, such as from rain showers, motor vehicles, and angel activity. A better clutter suppression can however be obtained by increasing the pulse repetition frequency, but this will be at the expense of the range of the radar system. When using a pulse repetition frequency of say 2000 Hz, the detection of targets is limited to a range of 50 to 60 km.

With the radar system described in the cited patent, a considerable limitation is imposed on the radar range when high demands are made upon clutter suppression. It is therefore an object of the present invention to avoid such a situation and to enable detection of targets at a range of 200 to 250 km, while obtaining a very good clutter suppression.

According to the invention, the pulse repetition frequency of the second generator is chosen larger than that of the first generator. In a particular embodiment, the pulse repetition frequency of the frequency-modulated pulses of relatively long duration is 500 Hz and that of the transmitter pulses of relatively short duration is 2000 Hz. Realising that clutter is most prominent at ranges up to 30–50 km and using relatively short duration pulses having a repetition frequency of say 2000 Hz and relatively long duration frequency-modulated pulses having a repetition frequency of say 500 Hz in one and the same radar system, it is possible to obtain both optimal clutter suppression and a long radar range, as will be shown in the following description.

Figure 2:
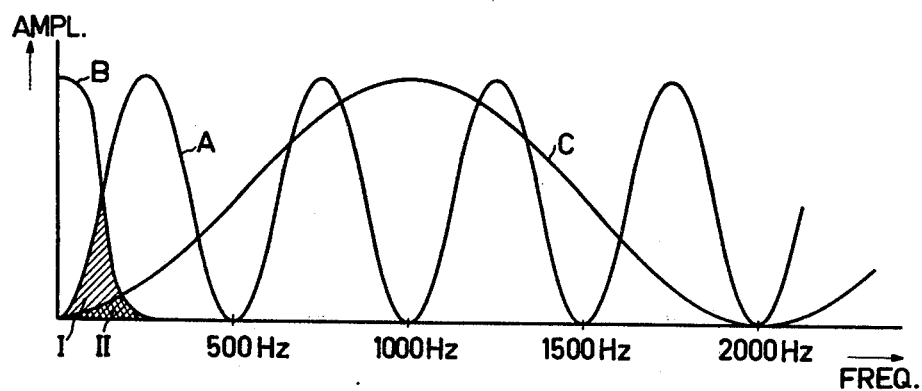
Figure 3:
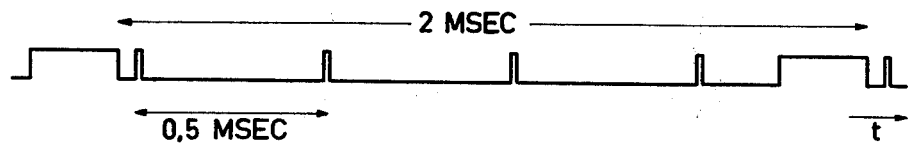
Figure 4:
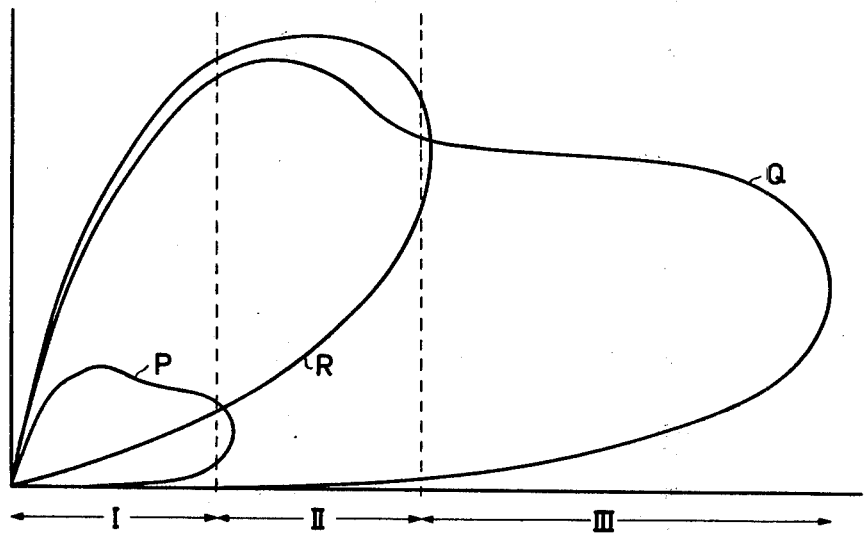

The invention will now be described in more detail with reference to the accompanying drawings, in which:

FIG. 1 illustrates a block diagram of the radar system according to the invention; and FIGS. 2–4 are explanatory diagrams of the operation of the radar system of FIG. 1.

The radar system shown in FIG. 1 comprises a first generator 1 for generating frequency-modulated transmitter pulses of relatively long duration and a second generator 2 for generating transmitter pulses of relatively short duration. The radar system further comprises an oscillator 3, determining the frequencies of the two kinds of transmitter pulses via lines 4 and 5, and a timing unit 6 controlled by oscillator 3. The timing unit determines the pulse repetition frequency of the transmitter pulses via lines 7 and 8.

The two generators are connected to a transmitting channel 9, in which the frequencies of the two kinds of transmitter pulses are stepwise transformed into the desired transmission frequencies. Transmitting channel 9 includes, for the long duration transmitter pulses, a first mixer 10, a first bandpass filter 12, a second mixer 14 and a second bandpass filter 16, and for the short duration pulses a first mixer 11, a first bandpass filter 13, a second mixer 15, and a second bandpass filter 17. The short and long duration pulses are mixed in mixers 10 and 11 with a signal supplied via line 18. Bandpass filters 12 and 13 transmit only the desired side frequencies of the output signals from mixers 10 and 11, respectively. In mixers 14 and 15 the signals passed through filters 12 and 13 are mixed with a signal from oscillator 19 supplied via line 20. Again, bandpass filters 16 and 17 transmit only the desired frequencies. The transmitter pulses produced by the two generators and transformed in frequency in this manner are combined by a unit 21 in a common r.f. channel and transmitted via an r.f. amplifier 22, a circulator 23 and an antenna unit 24. It should be noted that in the terminology here employed the unit 21 and the amplifier 22 still form part of the transmitting channel 9. The bandpass filters 16 and 17 located before the unit 21 in the transmitter channel 9 may be replaced by one bandpass filter which is inserted behind the unit 21 and which has the same characterstics as bandpass filters 16 and 17.

The return signals received by the antenna unit 24 are also supplied to a receiver 25 via the circulator 23. Receiver 25 includes a first and a second receiving channel, the first part of each of these channels comprising respectively, a first bandpass filter 26 and 27, an r.f. amplifier 28 and 29, a second bandpass filter 30 and 31, a first mixer 32 and 33, a third bandpass filter 34 and 35, a second mixer 36 and 37, and an intermediate frequency amplifier 38 and 39. In these portions of the receiver channels part of the frequencies of the return signals from the frequency-modulated transmitter pulses of relatively long duration and the transmitter pulses of relatively short duration are separated, amplified and stepwise transformed into signals of the desired i.f. frequency. The prime purpose of bandpass filters 26 and 27 is to accomplish a channel separation with respect to the received return signals. In addition, these filters also prevent saturation by signals intended for the first and second receiving channels in the r.f. amplifiers 28 and 29 coupled to bandpass filters 26 and 27. In the embodiment here described, the r.f. amplifiers 28 and 29 are of the "low noise transistor amplifier" (LNTA) type. After filtering in bandpass filters 30 and 31, the amplified r.f. signals are applied to the mixers 32 and 33 and mixed with a signal supplied by oscillator 19 via line 20. The bandpass filters 34 and 35 again transmit the desired frequencies. The function of the bandpass filters 30 and 31 is to keep the noise generated in the - wide band - LNTA's outside the considerably narrower band of mixers 32 and 33. In mixers 36 and 37 these frequencies are subsequently transformed to an intermediate frequency level through the application of a signal supplied by oscillator 3 via line 18, and the i.f. signal obtained is applied to amplifiers 38 and 39.

The frequency-modulated return signals of relatively long duration are processed in the first receiving channel, the first part of which consisting of the units 26, 28, 30, 32, 34, 36 and 38. Apart from these units, the first receiving channel contains a pulse compression filter 40, a detector 41 and a first MTI filter 42. The return signals from amplifier 38 are consequently compressed, phase-detected by means of a signal which is supplied by oscillator 3 via line 43 and which is in phase with the relevant transmitter pulses, and are finally processed by the MTI-filter. In the radar system here described the MTI filter 42 functions as a "double canceller."

The return signals of relatively short duration are processed in the second receiving channel, the first part of which consisting of the units 27, 29, 31, 33, 35, 37 and 39. Apart from these units, the second receiving channel also comprises a detector 44 and a second MTI filter 45. The return pulses from amplifier 39 are detected by means of a signal which is supplied by oscillator 3 via line 46 and which is in phase with the relevant transmitter pulses. In the embodiment shown in FIG. 1, the detector 44 consists of detectors 47 and 48 and a 90° phase-shifting element 49, accomplishing a phase detection in two mutually perpendicular components. This method of detection is applied in view of the MTI filter 45 here employed, as this filter functions as a quadrature canceller.

On combining the signals obtained in the two channels described above, and assuming that the two kinds of transmitter pulses have the same pulse repetition frequency, the radar system obtained differs in design from that described in the U.S. Pat. No. 3,945,011, but in principle there is no appreciable differences in operation of the two systems.

When the radar system of the cited patent is required to detect targets up to a range of 200–250 km, a relatively low pulse repetition frequency $f_o$ must be selected in order to avoid second-time-around echoes. Since: 2 × target range × $f_o$ < c, where c denotes the velocity of propagation of the transmitted pulses, a pulse repetition frequency $f_o = 500$ Hz has been selected for the frequency-modulated pulses in the radar system in the embodiment in question.

In FIG. 2 the curve A represents the response curve for MTI filter 42, functioning as double canceller, at a pulse repetition frequency $f_o = 500$ Hz. The frequency range covered by clutter signals is shown in this figure by the area bounded by the curve B; the doppler frequency of these clutter signals, originating from rain showers, motor vehicles and angel activity, lies largely in the range 0–200 Hz, if the transmitting frequency is in the L-band. This means that the hatched portions I and II are situated within the bandpass range of the MTI filter. That is, at a pulse repetition frequency $f_o = 500$ Hz, the clutter is insufficiently suppressed. If, on the other hand, a pulse repetition frequency of say $4f_o = 2000$ Hz were chosen and the response curve of the MTI filter be represented by the curve C, only the hatched part II would be situated within the bandpass range of the MTI filter, giving a considerable improvement in clutter suppression. In the radar system described in the cited U.S. patent, this would however result in a reduction of the maximum target range to 60–75 km.

The above disadvantage can however be mitigated by imparting a different pulse repetition frequency to the two kinds of transmitter pulses employed. In the embodiment shown in FIG. 1 the pulse repetition frequency of the frequency-modulated pulses of relatively long duration is 500 Hz and that of the short duration pulses 2000 Hz. FIG. 3 illustrates the two kinds of pulses with respect to time. FIG. 4 shows some beam patterns in height and range. The curve P represents the beam pattern of the short duration pulses and the curve Q the beam pattern of the frequency modulated, long duration pulses. In view of the high pulse repetition frequency, a good clutter suppression is achieved within the range covered by the beam P. Taking into account that clutter is most prominent at ranges up to 30–50 km, i.e. within the range covered by beam P, and considering that in the processing of target returns from beam Q only those ranges which are greater than the range covered by beam P, the amount of clutter over the total range of the radar system is greatly reduced.

A still better result is obtained by adding a separate receiving element to the antenna unit 24 for detection of return signals from the frequency-modulated transmitter pulses of relatively long duration, as reflected within an antenna receiving beam pattern which substantially coincides with the most elevated part of the beam pattern produced by the transmitted frequency-modulated pulses. In FIG. 4 this receiving beam pattern is represented by the curve R which covers the most elevated part of beam Q.

The return signals within the receiving beam pattern R are detected in a third receiving channel. This channel consists of a bandpass filter 50, an LNTA type r.f. amplifier 51, and a part which is common to the first and third receiving channels and which consists of the afore-mentioned elements 30, 32, 34, 36, 38, 40, 41 and 42. Frequency-modulated, long duration return signals from either beam Q or beam R can be processed via a (pin diode) switch S1. To indicate the position assumed by switch S1 in a given time interval, the total range covered by the radar system is split into three parts, as shown in FIG. 4 by I, II and III.

If a target is located in the range interval I, the return signals are received from beams P and R. Relatively short duration return signals having a high repetition frequency are detected from beam P, achieving a good clutter suppression by means of the MTI filter 45. Frequency-modulated, relatively long duration return signals having a low pulse repetition frequency, are detected from beam R; however, in view of the orientation of beam R, a substantially clutter-free reception is realised through the MTI filter 42 in this case as well. In the above-described situation, the position of switch S1 is as shown in FIG. 1. Since the detected returns from MTI filter 45 appear at a greater repetition frequency than from the MTI filter 42, the second receiving channel is provided with a pulse accumulator 52 coupled to the MTI filter 45. The detected return signals are delayed in pulse accumulator 52 in such a way that with each pulse appearing from the MTI filter 42, the pulse accumulator supplies a pulse produced from the pulses supplied to this accumulator within a time corresponding to the repetition time of the frequency-modulated pulses. In the embodiment in question, the pulse accumulator 52 is supplied with four return pulses from the MTI filter 45 in the period of 2 msec preceding the appearance of a return pulse from the MTI filter 42. In response to this, and simultaneously with the appearance of the return pulse from the MTI filter 42, the pulse accumulator 52 delivers a pulse to a combination circuit 53. The return signal may be displayed on a PPI via switch S2 and an amplifier 54. In such a case, the position of switch S2 is as shown in FIG. 1.

If a target is situated in the range intervals II and III, the return signals are received from beam Q. Relatively long duration return signals having a low pulse repetition frequency are detected from beam Q. Switch S1 will then be in the position other than that indicated in the figure. If a target is situated in range interval II, the position of switch S2 is as shown, whereas in case the target is in range interval III, switch S2 is in the non-indicated position. In the first situation the compressed and detected signals are passed through the MTI filter 42, while in the latter situation the compressed pulses are detected in the linear detector 55, from which they are passed to the output of the radar system via switch S2 which is then in the position other than shown in the figure. Hence, in this case no clutter suppression occurs; however, this will not be necessary in view of the range at which the target is situated.

Finally it should be noted that, in order to prevent "second-time-around" problems and to ensure a good operation of the radar system, the two kinds of pulses may be staggered in a commonly applied manner. In such a case it is necessary to insert an interference suppression unit (ISU) behind each of the MTI filters 42 and 45.

What we claim is:

1. A radar system comprising a first generator for generating frequency-modulated transmitter pulses of relatively long duration, a second generator for generating transmitter pulses of relatively short duration at a pulse repetition frequency greater than that of said long duration pulses generated by said first generator, a transmitter channel, coupled to said first and second generators, for transmitting both the long and short duration transmitter pulses, and a receiver having a first receiving channel, including a pulse compression filter, for detecting return signals from the frequency-modulated transmitter pulses of relatively long duration, and a second receiving channel for detecting return signals from the transmitter pulses of relatively short duration.

2. The radar system, as claimed in claim 1, wherein the receiver includes a third receiving channel for detecting return signals from the frequency-modulated transmitter pulses of relatively long duration which are reflected within an antenna receiving beam pattern which substantially coincides with the most elevated part of the beam pattern formed by the transmitted frequency-modulated pulses.

3. The radar system as claimed in claim 2, wherein the first and the third receiving channels have a common portion and separate r.f. portions and the receiver includes a first switch which in a first position connects the r.f. portion of the third receiving channel to said common portion and in a second position connects the r.f. portion of the first receiving channel to said common portion.

4. The radar system as claimed in claim 3, wherein the receiver includes a second switch which in a first position passes the pulses compressed and detected in the common portion of the first and the third receiving channels to the output of the receiver through a first MTI filter, and which in a second position passes said pulses directly to the output of the receiver.

5. The radar system as claimed in claim 4, wherein the receiver comprises a combining circuit which is supplied on the one hand, via a second MTI filter and a pulse accumulator, with the pulses detected in the second receiving channel and on the other hand, via the first MTI filter, with the pulses compressed and detected in the common part of the first and the third receiving channels, while the pulses delivered by said combining circuit are passed to the output of the receiver through the second switch when it is in the first position.

* * * * *